(12) United States Patent
Colson et al.

(10) Patent No.: US 9,816,397 B2
(45) Date of Patent: Nov. 14, 2017

(54) BYPASS HOUSING IN AIR CYCLE MACHINE

(71) Applicant: HAMILTON SUNDSTRAND CORPORATION, Windsor Locks, CT (US)

(72) Inventors: Darryl A. Colson, West Suffield, CT (US); Craig M. Beers, Wethersfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 210 days.

(21) Appl. No.: 14/883,076

(22) Filed: Oct. 14, 2015

(65) Prior Publication Data

US 2017/0107855 A1  Apr. 20, 2017

(51) Int. Cl.
*F01D 25/24* (2006.01)
*F01D 25/32* (2006.01)
*F01D 17/10* (2006.01)

(52) U.S. Cl.
CPC ......... *F01D 25/243* (2013.01); *F01D 17/105* (2013.01); *F01D 25/32* (2013.01); *F05D 2220/30* (2013.01); *F05D 2260/602* (2013.01); *F05D 2260/606* (2013.01)

(58) Field of Classification Search
CPC .. F04D 27/009; F04D 29/4206; F04D 29/422; F01D 25/243; F01D 25/24; B64D 2013/0648
See application file for complete search history.

(56) References Cited

U.S. PATENT DOCUMENTS

| | | | | |
|---|---|---|---|---|
| 8,596,697 | B1 * | 12/2013 | Haibel | F16J 13/12 220/298 |
| 2003/0205047 | A1 * | 11/2003 | Allmang | F01D 9/026 60/602 |
| 2013/0287555 | A1 * | 10/2013 | Rosen | F04D 17/122 415/182.1 |
| 2014/0030080 | A1 * | 1/2014 | Chrabascz | F01D 25/285 415/203 |
| 2014/0044531 | A1 * | 2/2014 | Rosen | F04D 29/422 415/182.1 |

* cited by examiner

*Primary Examiner* — Woody Lee, Jr.
*Assistant Examiner* — Sabbir Hasan
(74) *Attorney, Agent, or Firm* — Cantor Colburn LLP

(57) ABSTRACT

A turbine bypass housing is provided. The housing includes a body having an inlet end and an outlet end and defining an interior, an outlet flange is configured at the outlet end and has a rim diameter, and an inlet flange is configured at the inlet end and has a flange thickness. An interior wall of the body has a first fillet radius proximal to the inlet flange and at least one boss is configured on an exterior of the body, wherein the boss defines a boss aperture therein, the boss aperture extending from an exterior of the body to the interior of the body. The flange thickness is 0.200±0.005 inches (0.508±0.013 cm).

20 Claims, 4 Drawing Sheets

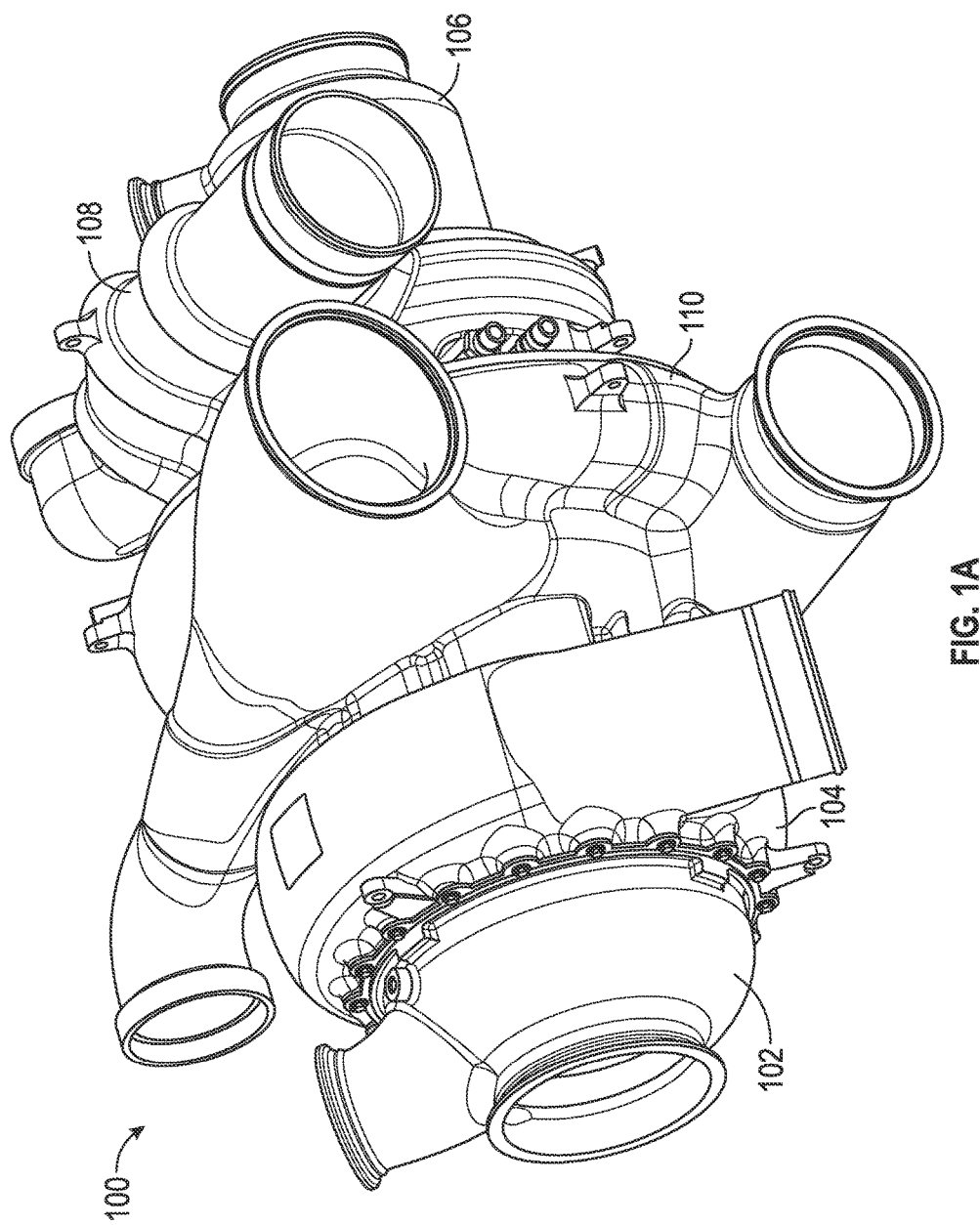

BYPASS HOUSING IN AIR CYCLE MACHINE

BACKGROUND

The subject matter disclosed herein generally relates to air cycle machines and, more particularly, to bypass housing in air cycle machines.

Conventional aircraft environmental control systems incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor, an additional turbine rotor, or an additional compressor rotor. In some cases the turbine or turbines drive both the compressor and the fan.

On aircraft powered by turbine engines, the air to be conditioned in the air cycle machine is typically compressed air bled from one or more compressor stages of the turbine engine. In conventional systems, this bleed air passes through the air cycle machine compressor where it is further compressed. The compressed air is passed through a heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the aircraft cabin as conditioned cooling air.

SUMMARY

According to one embodiment, a turbine bypass housing is provided. The housing includes a body having an inlet end and an outlet end and defining an interior, an outlet flange is configured at the outlet end and has a rim diameter, and an inlet flange is configured at the inlet end and has a flange thickness. An interior wall of the body has a first fillet radius proximal to the inlet flange and at least one boss is configured on an exterior of the body, wherein the boss defines a boss aperture therein, the boss aperture extending from an exterior of the body to the interior of the body. The flange thickness is 0.200±0.005 inches (0.508±0.013 cm).

According to another embodiment, a turbine bypass housing is provided. The housing includes a body having an inlet end and an outlet end and defining an interior, an outlet flange is configured at the outlet end and has a rim diameter, and an inlet flange is configured at the inlet end and has a flange thickness. An interior wall of the body has a first fillet radius proximal to the inlet flange and at least one boss is configured on an exterior of the body, wherein the boss defines a boss aperture therein, the boss aperture extending from an exterior of the body to the interior of the body. A ratio of the flange thickness to the general wall thickness is 2.105.

According to another embodiment, a turbine bypass housing is provided. The housing includes a body having an inlet end and an outlet end and defining an interior, an outlet flange is configured at the outlet end and has a rim diameter, and an inlet flange is configured at the inlet end and has a flange thickness. An interior wall of the body has a first fillet radius proximal to the inlet flange, and at least one boss is configured on an exterior of the body, wherein the boss defines a boss aperture therein, the boss aperture extending from an exterior of the body to the interior of the body. The body includes a general fillet radius, and wherein a ratio between the first fillet radius and the general fillet radius is 1.330.

Technical effects of embodiments of the present disclosure include a turbine bypass housing having an improved ability to manage high stresses caused by delta pressure across a membrane between a turbine inlet and a turbine outlet. Further technical effects include a turbine bypass housing configured to allow liquid drainage while not degrading performance due to flow leakage. Further technical effects include a turbine bypass housing configured to address high stress caused by pressure and maneuver loads during operation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 1A is an isometric schematic view of an air cycle machine;

DETAILED DESCRIPTION

Figure 1B:
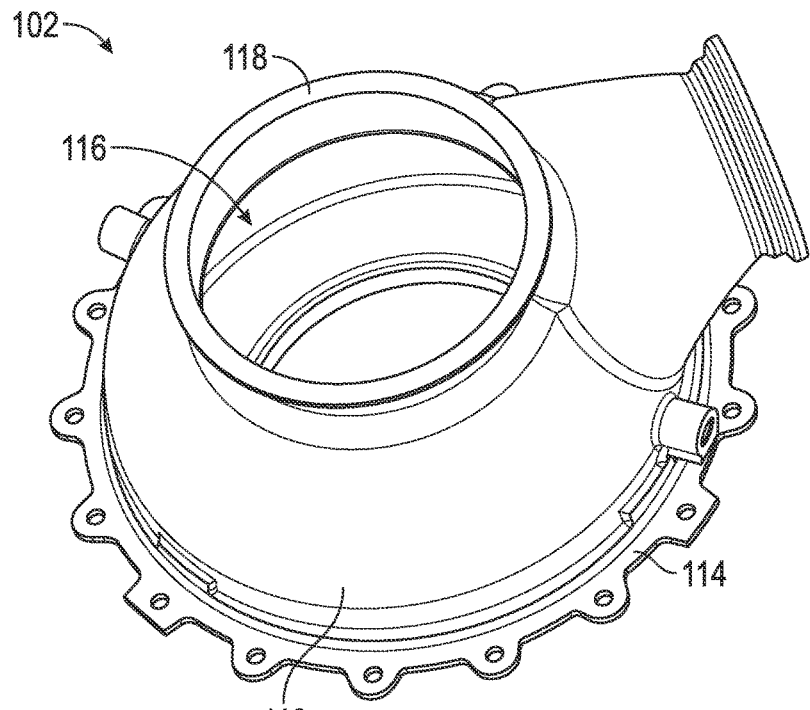
FIG. 1B is an isometric schematic view of a turbine bypass housing for an air cycle machine in accordance with an embodiment.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1C:
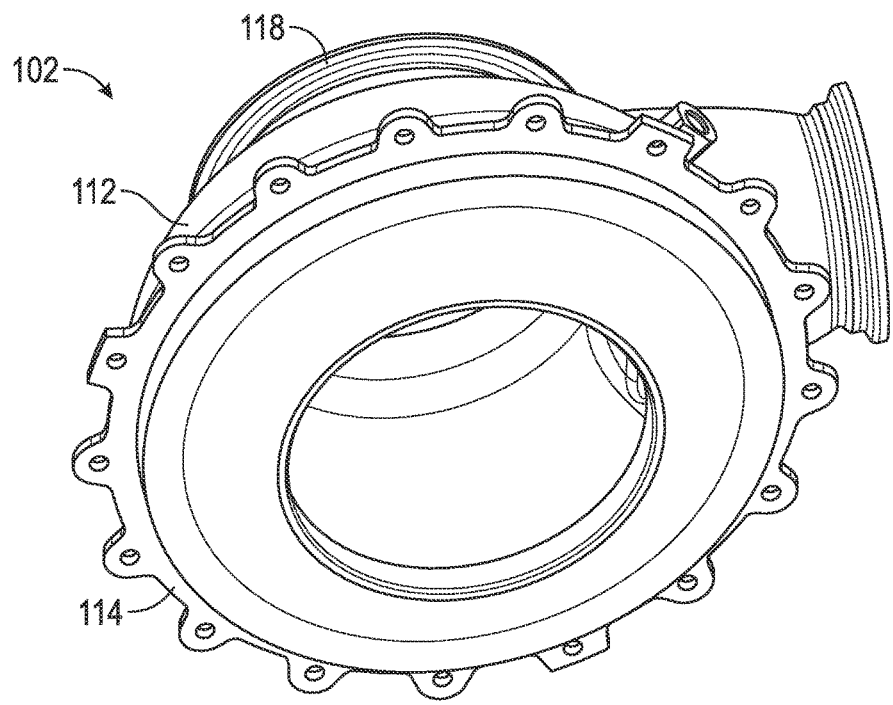
FIG. 1C is an alternative isometric schematic view of the turbine bypass housing of FIG. 1B.

FIG. 1A is an isometric schematic of an air cycle machine 100 in accordance with an embodiment of the present disclosure. FIG. 1B is an isometric schematic of a bypass housing 102 of the air cycle machine 100, separated from the air cycle machine 100. FIG. 1C is an alternative isometric schematic of the bypass housing 102.

As shown in FIG. 1A, the air cycle machine 100 includes a first bypass housing 102 and a first inlet housing 104. On an opposing end of the air cycle machine 100 is a second bypass housing 106 and a second inlet housing 108. Located between the first inlet housing 108 and the second inlet housing 104 is a compressor housing 110. As shown, the first turbine bypass housing 102, the first inlet housing 104, the compressor housing 110, the second inlet housing 108, and the second bypass housing 106 are arranged axially to form the air cycle machine 100. In some embodiments, the air cycle machine 100 may include a first turbine and a second turbine, and the first bypass housing 102 may be configured as a second turbine-bypass housing. Those of skill in the art will appreciate that the bypass housing may be configured for any turbine of an air cycle machine.

Turning to FIGS. 1B and 1C, isometric schematic views of the first bypass housing 102 are shown. The bypass housing 102 includes a body 112 having a flange 114 on one end thereof. The body 112 also includes a turbine outlet 116 at an opposing end thereof, the turbine outlet 116 being defined by an outlet flange 118.

Figure 2A:
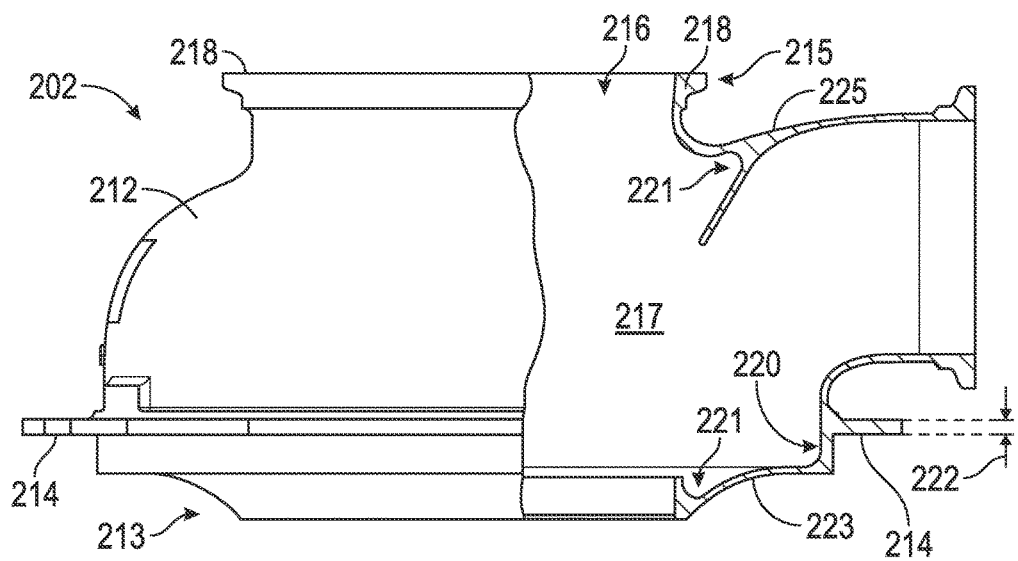
FIG. 2A is a partial cross sectional schematic view of a turbine bypass housing in accordance with an embodiment.
Figure 2B:
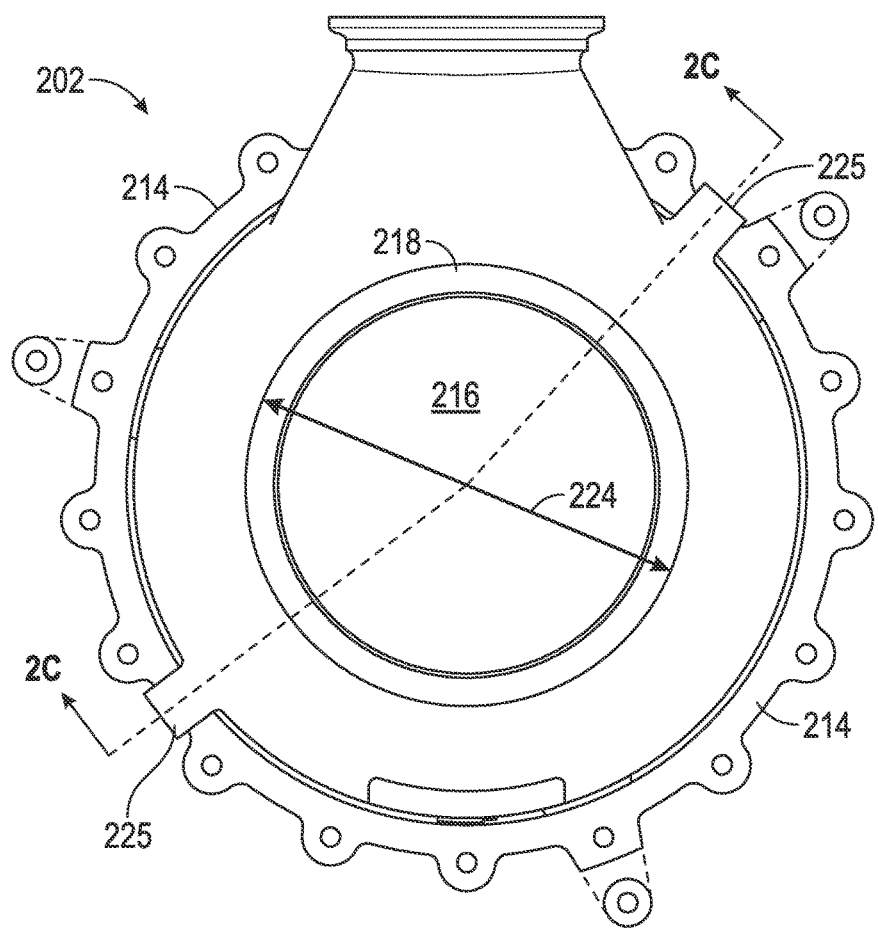
FIG. 2B is a plan view of the turbine bypass housing of FIG. 2A.
Figure 2C:
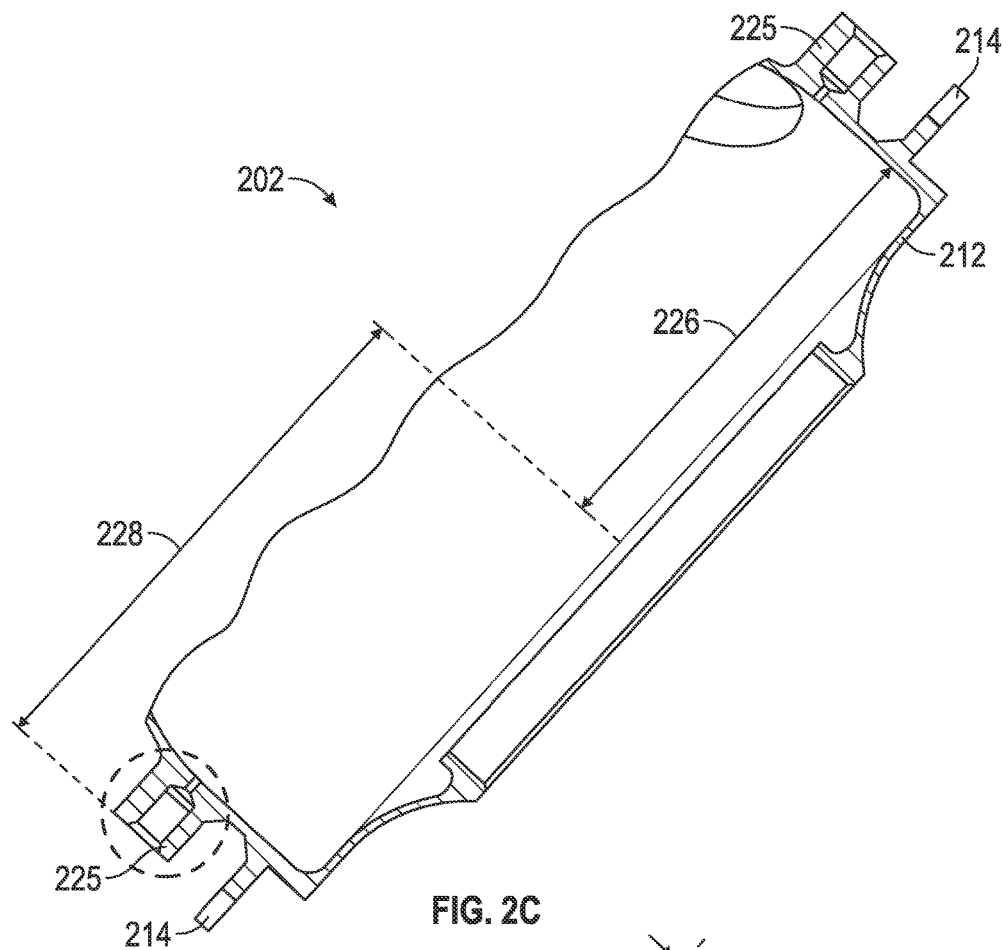
FIG. 2C is a partial cross-sectional view of the turbine bypass housing along the line 2C-2C of FIG. 2B.
Figure 2D:
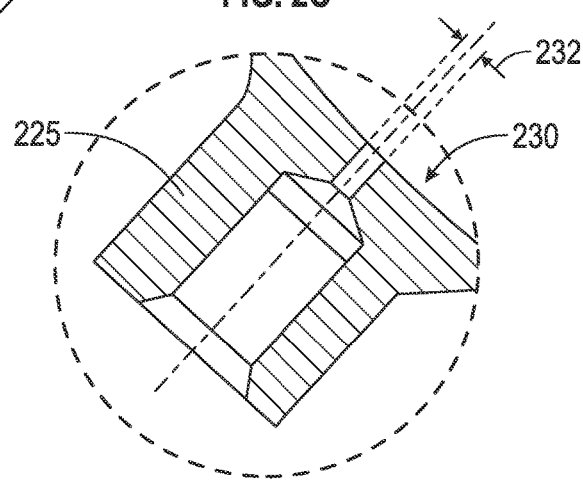
FIG. 2D is an enlarged schematic of a boss of the turbine bypass housing of FIG. 2A.

Turning now to FIG. 2A-2D, several schematic views of a turbine bypass housing 202 are shown. FIG. 2A shows a side, partial cut-away view of the turbine bypass housing 202. FIG. 2B shows a plan schematic view of the turbine bypass housing 202. FIG. 2C shows a partial cross-sectional schematic view of the turbine bypass housing 202 as viewed along the line 2C-2C shown in FIG. 2B. FIG. 2D is an enlarged view of a portion of the turbine bypass housing 202.

As shown in FIG. 2A, the turbine bypass housing 202 includes a body 212 having an inlet end 213 and an outlet end 215. Fluid may pass through the turbine bypass housing 202 from the inlet end 213 to the outlet end 215 by passing through an interior 217 of the body 212. At the inlet end 213 is an inlet flange 214 and at the outlet end 215 is the outlet flange 218. As shown, the outlet flange 218 defines a turbine outlet 216 therein. On the interior side of the body 212, adjacent the inlet flange 214 is a first fillet radius 220. The first fillet radius 220 may be a unique fillet radius configured to address high stress caused by delta pressure across a turbine inlet surface 223 and a turbine outlet surface 225.

In some embodiments, the first fillet radius may be 0.250±0.030 inches (0.635±0.076 cm). Further, in some embodiments, the first fillet radius 220 may be configured with a ratio against a general fillet radius 221 of the turbine bypass housing 202. For example, in some embodiments, the general fillet radius 221 may be configured as 0.188±0.030 inches (0.478±0.076 cm). Furthermore, the first fillet radius 220 may have a ratio of 1.330 to the general fillet radius 221.

Also shown in FIG. 2A, the inlet flange 214 has a flange thickness 222. The flange thickness 222 may be configured to be thicker than a general wall thickness of the body 212. For example, the inlet flange 214 may be configured to have a thicker material than the wall thickness of the other parts of the body 212 to address high stress caused by pressure and maneuver loads of an aircraft on which the turbine bypass housing 202 is installed. In some non-limiting embodiments, the flange thickness 222 may be 0.200±0.005 inches (0.508±0.013 cm). Further, in some embodiments, the flange thickness 222 may be configured based on a ratio between the flange thickness and the general wall thickness. For example, in some embodiments the ratio of the flange thickness to the general wall thickness may be equal to 2.105. Thus, for example, if the flange thickness 222 is 0.200±0.005 inches (0.508±0.013 cm), the general wall thickness may be 0.095±0.020 inches (0.241±0.051 cm).

Turning now to FIG. 2B, a plan view of the turbine bypass housing 202 is shown. As shown, the outlet flange 218 defining the turbine outlet 216 has a rim diameter 222. The rim diameter 222 is the largest diameter of the outlet flange 218. In some embodiments the outlet flange 218 may have a rim diameter 224 of 6.641±0.005 inches (16.868±0.013 cm).

Turning now to FIG. 2C, a partial cross-sectional view of the turbine bypass housing 202 along the line 2C-2C in FIG. 2B is shown. The line 2C-2C passes through bosses 225 configured on an exterior of the body 212. As shown in FIG. 2C, the body 212 may have an interior radial length 226 of 4.890±0.045 inches (12.421±0.114 cm). That is, the interior radial length 226 is a distance from a center point of the body 212 to a point on an interior wall of the body 212. Further, as shown in FIG. 2, a radial length to an exterior point defined by the bosses 225 may have a boss radial length 228 of 5.750±0.010 inches (14.605±0.025 cm). In some embodiments, the boss radial length 228 may be configured as a dimension based on a ratio with the interior radial length 226. For example, in some embodiments, the ratio of the boss radial length 228 to the interior radial length 226 may be 1.176.

Turning now to FIG. 2D, an enlarged view of a boss 225. Each boss 225 of the turbine bypass housing 202 may have a boss aperture 230 passing therethrough. The boss aperture 230 may be configured to enable liquid drainage while not degrading performance due to flow leakage. Thus, the boss aperture 230 may have a boss aperture diameter 232 that is configured for such results. In some embodiments, the boss aperture diameter 232 may be 0.080±0.005 inches (0.203±0.013 cm). Further, in some embodiments, the boss aperture diameter 232 may be configured based on a ratio with the rim diameter 224 (shown in FIG. 2B). In some embodiments, the ratio of the boss aperture diameter 232 to the rim diameter 224 may be 0.012.

Advantageously, embodiments described herein provide a turbine bypass housing configured to enable increased pressure and temperatures during operation of an aircraft. Further, advantageously, such increased performance may be implemented with little increase or impact on the weight of the turbine bypass housing.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:
1. A turbine bypass housing comprising:
A body having an inlet end and an outlet end and defining an interior;
an outlet flange is configured at the outlet end and has a rim diameter;

an inlet flange is configured at the inlet end and has a flange thickness;

an interior wall of the body has a first fillet radius proximal to the inlet flange;

at least one boss is configured on an exterior of the body, wherein the boss defines a boss aperture therein, the boss aperture extending from an exterior of the body to the interior of the body, wherein the flange thickness is 0.200±0.005 inches.

2. The bypass housing of claim 1, wherein the body has a general wall thickness of 0.095±0.020 inches.

3. The bypass housing of claim 1, wherein the first fillet radius is 0.250±0.030 inches.

4. The bypass housing of claim 1, wherein the body includes a general fillet radius, and wherein a ratio between the first fillet radius and the general fillet radius is 1.330.

5. The bypass housing of claim 1, wherein the body has an interior radial length, and the at least one boss defines a boss radial length, wherein a ratio of the boss radial length to the interior radial length is 1.176.

6. The bypass housing of claim 5, wherein the interior radial length is 4.890±0.045 inches.

7. The bypass housing of claim 1, wherein the boss aperture has a diameter of 0.080±0.005 inches.

8. The bypass housing of claim 1, wherein the boss aperture has a diameter, and wherein a ratio of the boss aperture diameter to the rim diameter is 0.012.

9. A turbine bypass housing comprising:

a body having an inlet end and an outlet end and defining an interior, the body having a general wall thickness;

an outlet flange is configured at the outlet end and has a rim diameter;

an inlet flange is configured at the inlet end and has a flange thickness;

an interior wall of the body has a first fillet radius proximal to the inlet flange;

at least one boss is configured on an exterior of the body, wherein the boss defines a boss aperture therein, the boss aperture extending from an exterior of the body to the interior of the body, wherein a ratio of the flange thickness to the general wall thickness is 2.105.

10. The bypass housing of claim 9, wherein the body has a general wall thickness of 0.095±0.020 inches.

11. The bypass housing of claim 9, wherein the first fillet radius is 0.250±0.030 inches.

12. The bypass housing of claim 9, wherein the body includes a general fillet radius, and wherein a ratio between the first fillet radius and the general fillet radius is 1.330.

13. The bypass housing of claim 9, wherein the body has an interior radial length, and the at least one boss defines a boss radial length, wherein a ratio of the boss radial length to the interior radial length is 1.176.

14. The bypass housing of claim 13, wherein the interior radial length is 4.890±0.045 inches.

15. The bypass housing of claim 9, wherein the boss aperture has a diameter of 0.080±0.005 inches.

16. The bypass housing of claim 9, wherein the boss aperture has a diameter, and wherein a ratio of the boss aperture diameter to the rim diameter is 0.012.

17. A turbine bypass housing comprising:

a body having an inlet end and an outlet end and defining an interior;

an outlet flange is configured at the outlet end and has a rim diameter;

an inlet flange is configured at the inlet end and has a flange thickness;

an interior wall of the body has a first fillet radius proximal to the inlet flange;

at least one boss is configured on an exterior of the body, wherein the boss defines a boss aperture therein, the boss aperture extending from an exterior of the body to the interior of the body, wherein the body includes a general fillet radius, and wherein a ratio between the first fillet radius and the general fillet radius is 1.330.

18. The bypass housing of claim 17, wherein the first fillet radius is 0.250±0.030 inches.

19. The bypass housing of claim 17, wherein the boss aperture has a diameter of 0.080±0.005 inches.

20. The bypass housing of claim 17, wherein the boss aperture has a diameter, and wherein a ratio of the boss aperture diameter to the rim diameter is 0.012.

* * * * *